US009213763B2

(12) United States Patent
Purdy et al.

(10) Patent No.: US 9,213,763 B2
(45) Date of Patent: *Dec. 15, 2015

(54) SYSTEM AND METHOD FOR RESPONDING TO WEB FORM INQUIRIES

(71) Applicant: InsideSales.com, Inc., Provo, UT (US)

(72) Inventors: Thomas Jeffrey Purdy, Lehi, UT (US); David Randal Elkington, Mapleton, UT (US); Jeremiah Johnson, Springville, UT (US); Kenneth David Krogue, Mapleton, UT (US); James B. Oldroyd, Powell, OH (US)

(73) Assignee: InsideSales.com, Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/935,379

(22) Filed: Jul. 3, 2013

(65) Prior Publication Data
US 2014/0114997 A1    Apr. 24, 2014

Related U.S. Application Data

(63) Continuation of application No. 11/872,691, filed on Oct. 15, 2007, now Pat. No. 8,510,382.

(51) Int. Cl.
G06F 15/16 (2006.01)
G06Q 10/00 (2012.01)
G06F 17/30 (2006.01)
G06F 17/24 (2006.01)

(52) U.S. Cl.
CPC ........ *G06F 17/30861* (2013.01); *G06F 17/243* (2013.01)

(58) Field of Classification Search
None
See application file for complete search history.

(56) References Cited

U.S. PATENT DOCUMENTS

2002/0082892 A1* 6/2002 Raffel et al. ............... 705/8
2008/0033778 A1* 2/2008 Boss et al. ................. 705/9

* cited by examiner

*Primary Examiner* — Afshawn Towfighi
(74) *Attorney, Agent, or Firm* — Echelon IP LLC; Everett D. Robinson

(57) ABSTRACT

An apparatus, system, and method are disclosed for generating contact plans and responding to web form inquires using the contact plans.

20 Claims, 8 Drawing Sheets

White Paper

Please fill out the following information and the white paper on sales will be emailed to you immediately.

This white paper gives insights into marketing strategies and prepares you to fully implement a sound marketing strategy. Here's what you will learn:

10 Steps to Quadruple Sales Results:

- Find your Core Message
- Prioritize Features / Benefits
- Build an Assembly Line
- Motivate to Work Harder
- Get and Keep Permission
- Learn About Your Target Prospect
- Get Help from Gatekeepers
- Leave Compelling Voice Messages
- Sending Marketing Collateral
- Impression Marketing

*Required Fields

| Field | Value |
|---|---|
| First Name:* | John |
| Last Name:* | Doe |
| Company:* | Doe Enterprises |
| Email:* | John@doe.net |
| Phone:* | 999-555-1212 |
| How big is your sales team?:* | [SELECT] |

☑ Receive occasional product updates and offers.

Figure 6

EDIT CONTACT PLAN

700

Call Plan Name: [                    ]

Add New Trigger:  Field: [State v]  Value: [Utah        ]

[Add Trigger]

730 → Field/ Value      710 → ACD      720 → IVR      Delay Time (mins)

Lead Source

| | | | | |
|---|---|---|---|---|
| move up | Web | My Test ACD v | My TestIVR v | 1 | remove |
| move down | Phone | None v | My TestIVR v | 0 | remove |

Lead Status

| | | | | |
|---|---|---|---|---|
| move up | Now | My Test ACD v | None v | 5 | remove |
| move down | Closed | My Test ACD v | My TestIVR v | 0 | remove |
| | Apptment Set | My Test ACD v | My TestIVR v | 0 | remove |

Default

| | | |
|---|---|---|
| My Test ACD v | My TestIVR v | 10 |

Figure 7          [Save]

SYSTEM AND METHOD FOR RESPONDING TO WEB FORM INQUIRIES

CROSS-REFERENCE TO RELATED APPLICATIONS

This application is a continuation of U.S. patent application Ser. No. 11/872,691 filed Oct. 15, 2007, which is hereby incorporated by reference.

BACKGROUND

The present inventions relate to systems having means of user inquiry, for example through web form inquires. Enterprises often have web pages where users can request additional information via a web form. However, many enterprises are ill equipped to respond to such inquires in a manner that maximizes the potential of such requests. The inventions presented herein provide for automated guidance in fulfilling such inquiries, for example through the use of contact plans that contain information as to future contact attempts such as a relative time, contact method, backup time and method, etc.

BRIEF SUMMARY

The present invention has been developed in response to the present state of the art, and in particular, in response to the problems and needs in the art that have not yet been fully solved by currently available web form response systems and methods. Accordingly, the present invention has been developed to provide an apparatus, system, and method for responding to web form inquiries that overcome shortcomings in the art.

In one aspect of the present invention, certain embodiments of one method for responding to web form inquiries include providing a web form to a user that prompts the user for contact data, receiving contact data associated with the user via the web form, retrieving additional data associated with the user, associating the user with a preferred contact plan, and contacting the user in accordance with the preferred contact plan. Examples of contact data include name, address, phone number, fax number, email address, instant messaging address, availability data, interest data, and the like.

The method may also include visually or sonically presenting information on the user to an agent. The information may be delivered via a variety of delivery services such as email services, instant messaging services, short message services, enhanced messaging services, text messaging services, telephony-based text-to-speech services, and multimedia delivery services.

The preferred contact plan may include a preferred contact method and a schedule for executing contact attempts. Examples of a contact method include initiating a phone call, sending an email, sending a facsimile, sending a text message, sending a paging message, leaving a voice mail, and communicating with the individual via an interactive voice response (IVR) system. In one embodiment, the contact plan includes a strategy for queuing a contact attempt. In certain embodiments, the preferred contact plan is a hybrid plan created from partitioning contact plans into parts and assembling the parts into hybrid contact plans.

In another aspect of the present invention, certain embodiments of a system for responding to web form inquiries include a web server configured to provide a web form to a user that prompts the user for contact data, and receive contact data associated with the user in response to the user submitting the web form. The system may also include a data server configured to retrieve additional data associated with the user and associate the user with a preferred contact plan and a contact server configured to contact the user in accordance with the preferred contact plan and deliver information on the user to an agent.

In another aspect of the present invention, certain embodiments of an apparatus to develop a contact plan for responding to web form inquiries, include a data collection module that receives a plurality of contact attempt records corresponding to inquiries for one or more web forms, a data analysis module that analyzes the contact attempt records to find correlations between contact outcome information and other information associated with the contact attempts such as time information, user information, and contact method information. The contact outcome information may include success or failure information related to a specific contact purpose.

The apparatus may also include a contact plan generation module that receives the correlations and formulates one or more contact plans, and a plan selection module configured to receive contact data for a user and select an appropriate contact plan from the generated contact plans.

In another aspect of the present invention, certain embodiments of a method to develop a contact plan include receiving a plurality of contact attempt records corresponding to inquiries for at least one web form, the contact attempt records comprising time information, user information, contact method information, and contact outcome information, and analyzing the contact attempt records to find correlations between the contact outcome information and the time information, user information, and contact method information.

The method may also include using the correlations to formulate a plurality of contact plans and analyzing additional contact attempt records and associated customer information to formulate a set of enhanced contact plans. The method may also include receiving contact data from a user and using the contact data to determine an appropriate contact plan from a set of available contact plans.

The methods described herein may be embodied as a computer program product or computer readable medium bearing computer usable program codes executable to perform operations to accomplish the described methods. It should also be noted that references throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 6 is a computer interface diagram illustrating one particular example of one embodiment of a web form in accordance with the present invention;

FIG. 7 is a computer interface diagram illustrating one particular example of one embodiment of an interface for specifying particular elements of a contact plan in accordance with the present invention.

DETAILED DESCRIPTION

Figure 1:
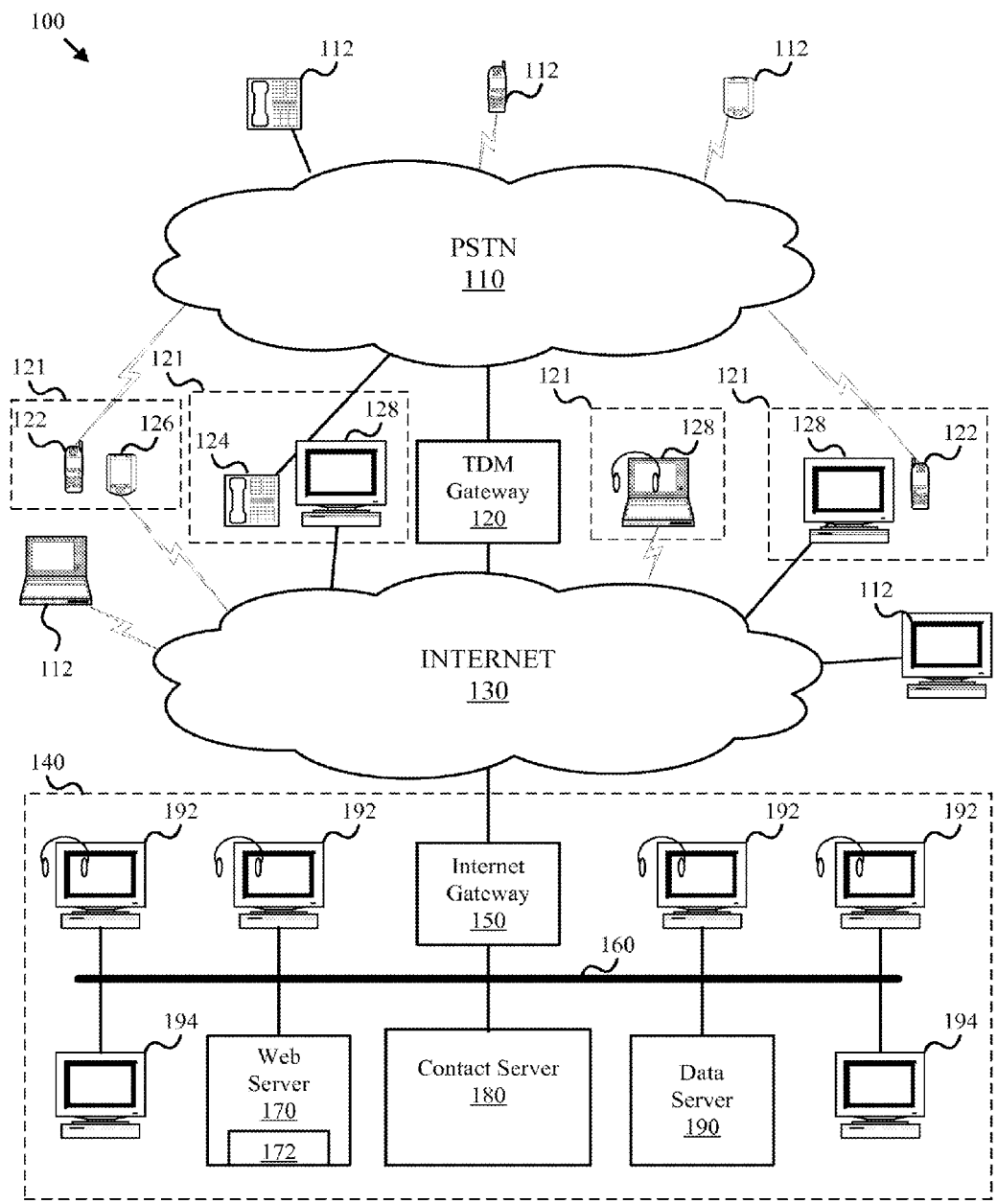
FIG. 1 is a schematic block diagram illustrating one embodiment of a web form response system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium or computer-readable medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one particular embodiment of a web form response system 100 in accordance with the present invention. As depicted, the web form response system 100 includes various components such as a public switched telephone network (PSTN) 110, user communication and/or computing devices 112, a TDM gateway 120 connecting the PSTN to an internet 130, remote agent stations 121, workstations 128, a call center 140, an internet gateway 150 connecting a local area network 160 to the internet 130, and various servers such as a web server 170, a contact server 180, and a data server 190, local agent workstations 192, and control workstations 194. The particular embodiment 100 is one example of components that can be operably interconnected to provide a web form response system wherein the components function collaboratively to improve contact success rates.

In the depicted embodiment, the remote agent stations 121 include wireless phones 122, wired phones 124, wireless computing devices 126, and workstations 128. In certain embodiments, the wireless phones 122 or the wired phones 124 maybe VOIP phones. In some embodiments, the computing devices 126 or the workstation 128 may be equipped with a soft phone. The remote agent stations 121 enable agents to provide services from remote locations similar to agents stationed at the workstations 192 and directly connected to the local area network 160.

In one embodiment, the local area network 160 resides within a call center 140 that uses VoIP and other messaging services to contact users connected to the PSTN 110 and/or the internet 130. The various servers in the call center 140 function cooperatively to receive web form submissions from users, contact users, provide customer data to agents via agent terminals such as the local agent workstations 192 and the remote agent stations 121, and connect the agents to the users. The users may be connected to the PSTN 110, the internet 130, or the like.

The web server 170 may provide one or more web forms 172 to users via browser displayable web pages. The web forms may be displayed to the users via a variety of communication and/or computing devices 112 including phones, laptop computers, desktop computers, media players, and the like that are equipped with a browser. In the depicted embodiment, the web forms 172 prompt the user for contact data such as name, address, phone number, fax number, email address, instant messaging address, referral information, availability information, and interest information. The web server 170 may receive the contact data associated with the user in response to the user submitting the web form and provide the contact data to the data server 190 or the like.

The data server 190 or the like may receive the contact data and retrieve additional data associated with the user such as web analytics data, reverse lookup data, credit check data, web site data, web site rank information, do-not-call registry data, data from a CRM database, and background check information. The data server may store the collected data in a datastore and associate the user with a preferred contact plan (not shown).

The contact server 180 or the like may contact the user in accordance with the preferred contact plan and deliver information on the user to an agent to enable the agent to achieve a particular purpose such as such as establishing a relationship with the user, thanking the user for their interest in a product, answering questions from the user, informing the user of a product or service offering, selling a product or service, surveying the user on their needs and preferences, and providing support to the user. The contact server 180 may deliver the information to the agent using a variety of delivery services such as email services, instant messaging services, short message services, enhanced messaging services, text messaging services, telephony-based text-to-speech services, and multimedia delivery services. The agent terminals 121 or 192 may visually or sonically present the information on the user and enable the agent to communicate with the user.

Figure 2:
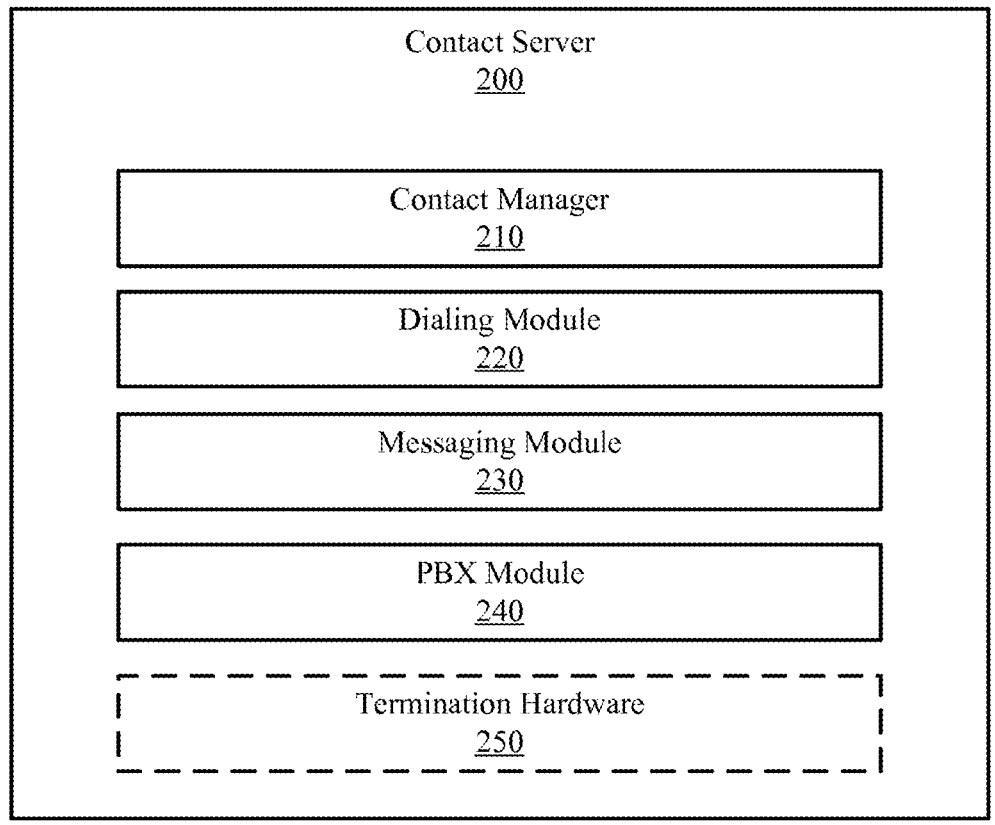
FIG. 2 is a schematic block diagram illustrating one embodiment of a contact server in accordance with the present invention.

FIG. 2 is a schematic block diagram illustrating one embodiment of a contact server 200 in accordance with the present invention. As depicted, the contact server 200 includes a contact manager 210, a dialing module 220, a messaging module 230, a PBX module 240 and termination hardware 250. The contact server 200 enables an agent to contact a user in conjunction with a contact plan. The contact server 200 is one example of the contact server 180 depicted in FIG. 1.

The contact manager 210 establishes contact with users and agents and manages contact sessions where needed. The contact manager 210 may initiate contact via the dialing module 220 and/or the messaging module 230.

The dialing module 220 establishes telephone calls including VOIP telephone calls and PSTN calls. In one embodiment, the dialing module 220 receives a unique call identifier, establishes a telephone call, and notifies the contact manager that the call has been established. Various embodiments of the dialing module 220 incorporate auxiliary functions such as retrieving telephone numbers from a database, comparing telephone numbers against a restricted calling list, transferring a call, conferencing a call, monitoring a call, playing recorded messages, detecting answering machines, recording voice messages, and providing interactive voice response (IVR) capabilities. In some instances, the dialing module 220 directs the PBX module 240 to perform the auxiliary functions.

The messaging module 230 sends and receives messages to agents and users. The messaging module may leverage one or more delivery or messaging services such as email services, instant messaging services, short message services, and enhanced messaging services. The PBX module 240 connects a private phone network to the public switched telephone network (PSTN) or the like. The contact manager 210 or dialing module 220 may direct the PBX module 240 to connect a line on the private phone network with a number on the PSTN or internet. In some embodiments, the PBX module 240 provides some of the auxiliary functions invoked by the dialing module 220.

The termination hardware 250 routes calls from a local network to the public switched telephone network (PSTN). In one embodiment, the termination hardware 250 interfaces to conventional phone terminals. In some embodiments and instances, the termination hardware 250 provides some of the auxiliary functions invoked by the dialing module 220.

Figure 3:
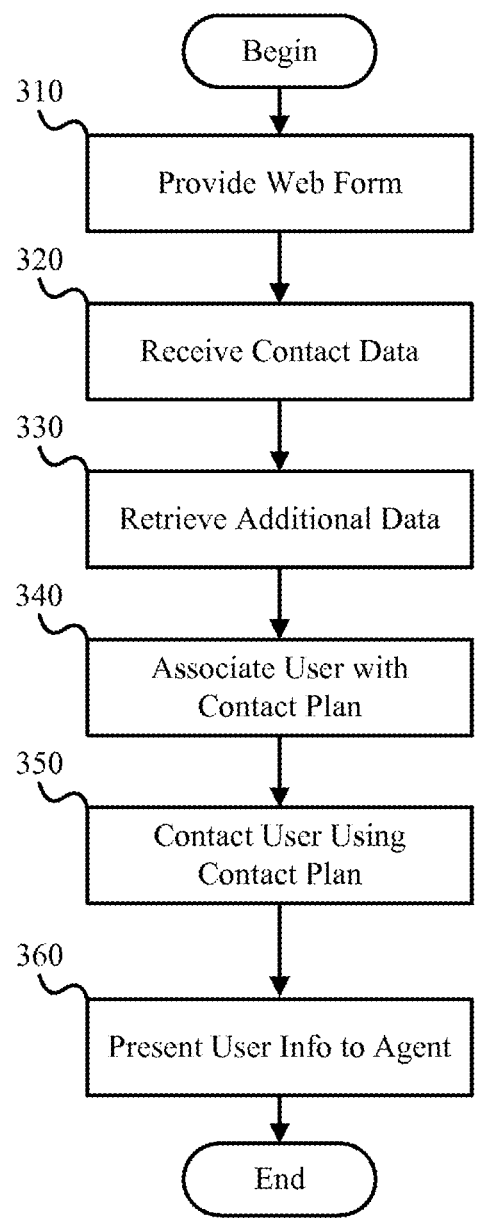
FIG. 3 is a schematic flow chart diagram illustrating one embodiment of a web form response method in accordance with the present invention.

FIG. 3 is a schematic flow chart diagram illustrating one embodiment of a web form response method 300 in accordance with the present invention. As depicted, the web response method 300 includes providing 310 a web form, receiving 320 contact data, retrieving 320 additional data, associating 340 a user with a preferred contact plan, contacting 350 the user, and presenting 360 information regarding the user to an agent. The web response method 300 improves contact rates and contact outcomes between an agent and a user.

Providing 310 a web form may include providing a browser displayable form that enables a user to submit contact information. One example of such a web form is shown in FIG. 6. Receiving 320 contact data may include receiving a web form submission for the user and providing contact data included within the submission to a data server such as the data server 190. Retrieving 330 additional data may include retrieving data from a variety of sources that could enable improved selection of a contact plan and/or improved success rates for achieving a particular purpose when contacting a user. Examples of additional data include web analytics data, reverse lookup data, credit check data, web site data, web site rank information, do-not-call registry data, data from a CRM database, and background check information.

Associating 340 a user with a preferred contact plan may include correlating the contact data and additional data with statistical data associated with a variety of contact plans and selecting the contact plan with the highest correlation as the preferred contact plan. The preferred contact plan may include a preferred contact time and contact method as well as a backup contact time and method. The preferred contact time may be 'immediately'. In certain embodiments, the contact plan includes a preferred schedule for contact attempts.

The preferred contact plan may also include a queuing strategy for handling a contact attempt with the user. For example, the queuing strategy may select an agent based on the demographic data of the user and the location of the user. Implementing a queuing strategy may improve success rates for contact experiences.

Contacting 350 the user may include contacting at a time and method specified by the preferred contact plan. The contact time may be a relative time such as 13 minutes after submission of a web form or an absolute time such as 8 µm on a Tuesday, or a range such as more than 10 minutes and less than 20 minutes after submission of a web form. The preferred contact time may be dependent on the particular web form. For one particular web form, a contact time within 5 minutes of the web form submission was found to yield superior results. For another web form, a contact time that was approximately 24 hours after the web form submission was found to yield superior results.

Examples of a contact method include initiating a phone call, sending an email, sending a facsimile, sending a text message, sending a paging message, leaving a voice mail, and communicating with the individual via an interactive voice response (IVR) system. In one embodiment, an IVR delivers a thank you message from a representative of the company (for example a CEO) and provides an opportunity to review product information, speak to an agent, request literature, and the like.

In one embodiment, a contact plan is deferred until a message or document or URL that is sent to the user is opened by the user. For example, an email message may have codes embedded therein that are executed when the user opens the email. The codes may generate a signal to the contact server or the like that initiates a contact plan.

Presenting 360 information regarding the user to an agent, may include visually or sonically presenting the contact data and additional data to an agent via an agent terminal. FIG. 7 depicts one example of presenting such information. In one embodiment, the information is presented to the agent via a screen pop or popup dialog. The information presented to the agent may be delivered using a variety of delivery services such as email services, instant messaging services, short message services, enhanced messaging services, text messaging services, telephony-based text-to-speech services, and multimedia delivery services.

Figure 4:
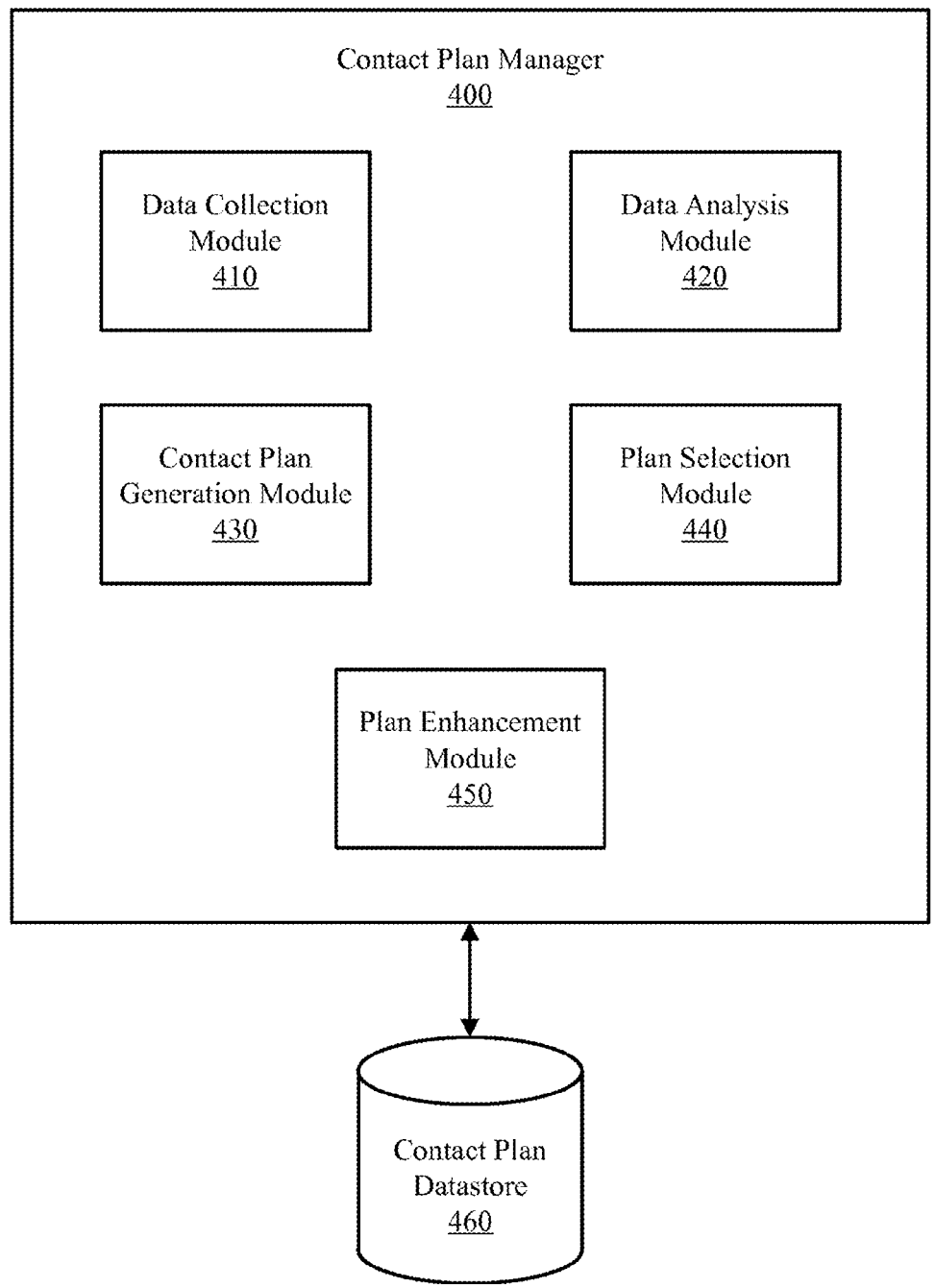
FIG. 4 is a schematic block diagram illustrating one embodiment of a contact plan manager in accordance with the present invention.

FIG. 4 is a schematic block diagram illustrating one embodiment of a contact plan manager 400 in accordance with the present invention. As depicted, the contact plan manager includes a data collection module 410, a data analysis module 420, a contact plan generation module 430, a plan selection module 440, and a plan enhancement module 440. The contact plan manager facilitates generation and selection of a preferred contact plan for responding to web form inquiries from users.

The data collection module 410 may aggregate contact attempt records or other data corresponding to inquiries for at least one web form. The contact attempt records or other data may include information that specifies the time, manner, and outcome of the contact attempts as well as user information. The data analysis module 420 may analyze the contact attempt records to find correlations between the contact outcome information and other information such as the time information, user information, and contact method information.

The contact plan generation module 430 may receive the correlations and formulate a variety of contact plans that reflect the statistical correlations between outcomes and the other information contained in the contact attempt records. In one embodiment, users with correlated data may be assigned to a group and a contact plan is generated for that group along with mean and variance information for specific information fields that may be used to correlate and compare other users with the group.

The plan selection module 440 may receive contact data for a particular user, correlate the data with statistical data associated with a number of available contact plans and select a preferred contact plan from the available contact plans. One of skill in the art will appreciate that a variety of algorithmic, statistical, or computational methods may be applied in determining which contact plan is preferred for a specific user. A contact plan datastore 460 may store the contact plans and data associated with the contact plans such as statistical data.

The plan enhancement module 450 may receive and analyze additional contact attempt records including associated customer data and determine if adjustments to the contact plans may result in enhanced performance for the response system 100 or the like. In certain embodiments, the plan enhancement module 450 may randomize a contact plan to increase contact success, and/or partition the contact plans into parts and combine the parts to create hybrid contact plans. For example, the contact plans may be partitioned into contact methods and contact purpose, each of which may be correlated to specific attributes from contact attempts records to create multiple subplans for various contact methods and contact purposes. The subplans for various contact methods and contact purposes may then be combined into a number of hybrid plans that each meet the needs of specific populations. One of skill in the art will appreciate that other forms of optimization not disclosed herein that are familiar to those of skill in the art may be conducted by the plan enhancement module 450.

Figure 5:
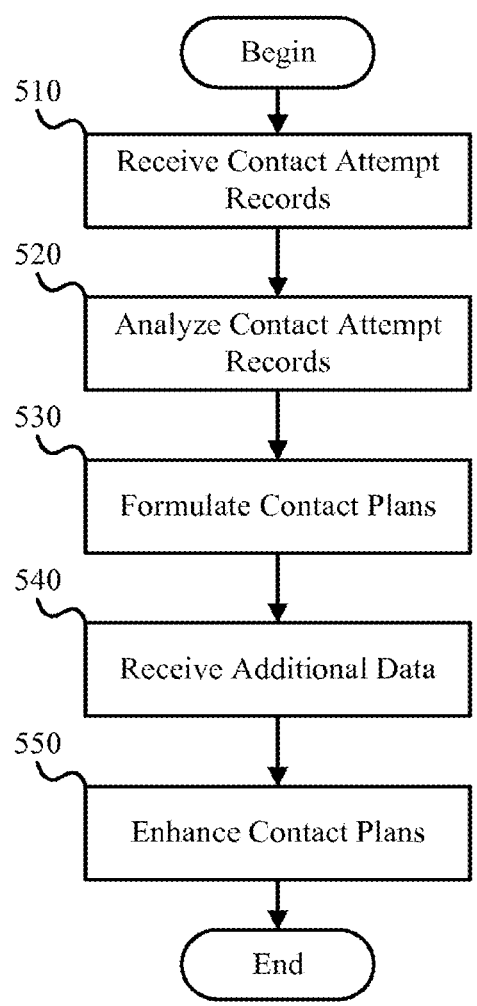
FIG. 5 is a schematic flow chart diagram illustrating one embodiment of a contact plan generation method in accordance with the present invention.

FIG. 5 is a schematic flow chart diagram illustrating one embodiment of a contact plan generation method 500 in accordance with the present invention. As depicted, the contact plan generation method 500 includes receiving 510 contact attempt records, analyzing 520 the contact attempt records, formulating 530 one or more contact plans, receiving 540 additional data, and enhancing 550 the contact plans.

Receiving 510 contact attempt records may include receiving contact attempt records corresponding to inquiries for one or more web forms. In certain embodiments, the contact attempt records include time information, user information, contact method information, and contact outcome information.

Analyzing 520 the contact attempt records may include finding correlations between the contact outcome information and the time information, user information, and contact method information. Formulating 530 one or more contact plans may include using the correlations to formulate a set of contact plans intended to improve contact successes. The method 500 may also include 540 analyzing additional contact attempt records and enhancing 550 the contact plans. In certain embodiments, enhancing 550 includes randomizing contact plans and/or partitioning the contact plans to facilitate hybridization. In one embodiment, enhancing 550 includes detecting if a contact plan is yielding substantially inferior results to a default plan, scrapping the plan if the results are substantially inferior to the default plan, and building a new contact plan to replace the inferior contact plan. The default plan may be a contact plan that is used if little information is known about a user and/or submitters of a particular form. In one embodiment, the default plan comprises contacting a user within 5 minutes of receiving a submitted web form.

FIG. 6 is a computer interface diagram illustrating one particular example of one embodiment of a web form 600 in accordance with the present invention. The depicted web form 600 invites a user to obtain more information concerning a subject of interest. In order to obtain the information, the user must provide certain information within the controls of the form and activate a submit control 605. In the depicted example, the information provided by the user includes identity information 610a, company information 610b, email address information 610c, and phone number information 610d.

FIG. 7 is a computer interface diagram illustrating one particular example of one embodiment of an interface 700 for specifying particular elements of a contact plan in accordance with the present invention. In the depicted embodiment, a queuing strategy 710 and an IVR script 720 can be specified for particular scenarios 730 such as source of the contact request or status of the contact process. By using the interface 700 and other interfaces to specify a variety of contact plans, data can be collected on the success of those contact plans and the collected data can be used to enhance the contact plans and the process of matching contact plans to particular users can be improved.

Figure 8:
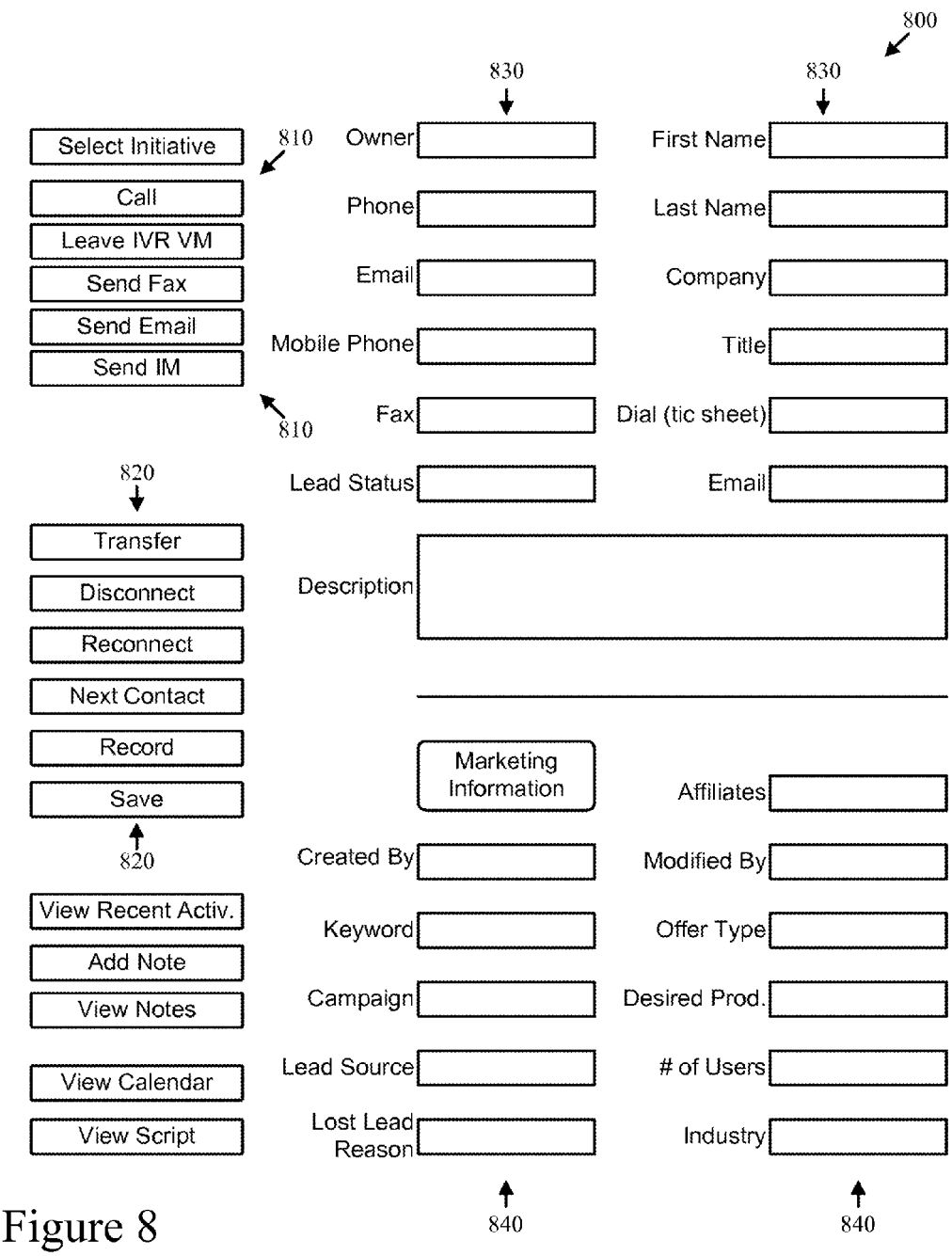
FIG. 8 is a computer interface diagram illustrating one embodiment of an exemplary agent interface in accordance with the present invention.

FIG. 8 is a computer interface diagram illustrating one particular example of one embodiment of an agent interface 800 in accordance with the present invention. In the depicted embodiment, the controls include controls 810 for contacting a user and controls 820 for controlling a conversation. The exemplary agent interface 800 also includes a large variety of information fields that provide information to the agent. The depicted embodiment includes user information fields 830 and marketing information fields 840. The information fields and controls of the interface 800 enable an agent to contact and/or communicate with a user in order to achieve a particular purpose.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A system for use in conjuction with a web server configured to receive contact data submitted by a contacting person via a web form on a browser displayable web page, the system responding to inquiries made by contacting persons through these web forms, those responses made through the use of contact plans that specify modes of contact with contacting persons, those contact plans containing information not specific to a particular contacting person but rather that information being capable of association to more than one person making contact through a web form, said system comprising:
    a data server configured to retrieve additional data associated with contacting persons, the additional data selected from the group consisting of: web analytics data, reverse lookup data, credit check data, web site data, web site rank information, do-not-call registry data, and background check information;
    said data server being further configured to access a set of contact plans containing contact plan information not specific to a particular contacting person, the contact plan information being capable of association to more than one person making contact through a web form, the contact plan information including a preferred contact time and a preferred contact method;
    said data server being further configured to automatically select a preferred contact plan from the set of accessed contact plans for each contacting person for which additional data has been retrieved, that selection of contact plans based on data selected from the group consisting of: the contact data received from contacting persons via the web form, retrieved additional data associated with contacting persons, contact attempt records, and contact outcome information;
    the data server further being configured to associate each contacting person with a selected preferred contact plan by which each contacting person may be identified by the contact plan information of a selected preferred contact plan; and
    a contact server configured to select a contacting person in accordance with a preferred contact plan to which the selected contacting person is associated and deliver information of the selected contacting person to an agent, the information of a selected contacting person including sufficient data for an agent to make contact with the selected contacting person using the mode of contact specified by the contact plan information of the preferred contact plan selected for the selected contacting person, said contacting server being further configured to perform that delivery of information of a selected contacting person upon the occurrence of an event specified in a contact time included in the contact plan information of the preferred contact plan associated to that contacting person for which information is being delivered.

2. A system as recited in claim 1, wherein the data server and the contact server are a single server performing the functions of both.

3. A system according to claim 1, wherein said data server is further configured to select preferred contact plans using a statistical associative method, and wherein said data server selects preferred contact plans for contacting persons that statistically best-fits contact data using a pre-determined established criteria.

4. A system as recited in claim 1, wherein said contact server is further configured to deliver identification of a preferred contact plan to which a selected contacting person is associated with the delivery to an agent of information of the selected contacting person, whereby a report of a contact attempt made with the information delivered to the agent may reference the contact plan that sourced the contact attempt.

5. A system for use in conjuction with a server configured to receive contact data submitted by a requesting person optionally via a web form on a browser displayable web page, the server receiving responses to requesting persons entering and submitting contact data optionally within web forms; the system responding to inquiries made by requesting persons seeking a return contact, those responses made through the use of contact plans that specify modes of contact with requesting persons, those contact plans containing information not specific to a particular requesting person but rather that information being capable of association to more than one person, said system comprising:
    a data server being configured to access a set of contact plans containing contact plan information not specific to a particular requesting person, the contact plan information being capable of association to more than one requesting person, the contact plan information that specifies a preferred contact time and a preferred contact method;
    said data server being further configured to receive or access contact data submitted by requesting persons;
    said data server being further configured to automatically select a preferred contact plan from the set of accessed contact plans for each requesting person, that selection of preferred contact plans based on data selected from the group consisting of: contact data submitted by requesting persons, retrieved additional data associated with requesting persons, contact attempt records, and contact outcome information;
    said data server being further configured to associate each requesting person with a selected preferred contact plan by which each requesting person may be identified by the contact plan information of a selected preferred contact plan; and
    a contact server configured to select a requesting person in accordance with a preferred contact plan to which the selected requesting person is associated and deliver information of the selected requesting person to an agent, the information of a selected requesting person including sufficient data for an agent to make contact with the selected requesting person using the mode of contact specified by the contact plan information of the preferred contact plan selected for the selected requesting person; said contacting server being further configured to perform that delivery of information of a selected requesting person upon the occurrence of an event specified in a contact time included in the contact plan information of the preferred contact plan associated to that requesting person for which information is being delivered;

a data collection module configured to receive a plurality of contact attempt records each corresponding to a submission of contact data submitted by a requesting person, the contact attempt records comprising one or more of: time information, personal information submitted by a requesting person, contact method information, and contact outcome information;

a data analysis module configured to analyze received contact attempt records to find correlations between information contained within the received contact attempt records and contact plan information contained within contact plans selected for individual requesting persons; and a contact plan generation module configured to receive found correlations by said data analysis module and automatically formulate a plurality of new contact plans, each of the formulated contact plans containing contact plan information not specific to a particular requesting person, the information within the new contact plans being capable of association to more than one person requesting contact, each new formulated contact plan including a contact time and a contact method.

6. A system according to claim 5, wherein at least two of said data server, said contact server, said data collection module, said data analysis module, and said contact plan generation module are implemented on a single computer.

7. A system according to claim 5, wherein at least one of said data server, said contact server, said data collection module, said data analysis module, and said contact plan generation module are distributed across two or more networked computers.

8. A system according to claim 5, wherein said data server is further configured to select preferred contact plans using a statistical associative method, and wherein said data server selects preferred contact plans for requesting persons that statistically best-fits contact data using a pre-determined established criteria.

9. A system according to claim 5, wherein said data server is configured to detect the event of said contact plan generation module having generated new contact plans, further wherein said data server is configured to automatically select and associate new preferred contact plans from new contact plans generated by said contact plan generation module for particular requesting persons upon such detection, and further wherein said contact server is configured to perform the selection of requesting persons in accordance with newly associated contact plans and to make new deliveries of information for requesting persons associated with new contact plans upon or anticipation of the occurrence of events specified in contact times included in each newly associated contact plan.

10. A method of maintaining a set of contact plans through a contact plan manager, the contact plan manager servicing the set of contact plans, each contact plan providing directions for making an attempt to contact a requesting person who has submitted contact data, each of those directions being non-specific to an individual requesting person and applicable to a set of requesting persons having some identified commonality, each contact plan containing information not specific to a particular requesting person, the directions of each contact plan being deliverable to a contacting agent in conjunction with some or all of the contact data submitted by a requesting person, the conjunction of the contact plan directions and contact data being sufficient to make an attempt to contact the requesting person to which that contact data pertains, the directions being deliverable to a contacting agent in an optionally modified state to render the delivered directions of a contact plan to be specific to a single requesting person, each contact plan specifying a contact time and a mode of contact, said method comprising the steps of:

(i) opening an agent interface, the agent interface providing a means of communicating contact data submitted by a requesting person to an agent;

(ii) receiving, by way of an opened agent interface, contact data earlier submitted by a requesting person in conjunction with directions sourced from a selected contact plan, the received directions being sourced from a contact plan serviced by the contact plan manager;

(iii) making a contact attempt as prescribed by directions and contact data received in the performance of step ii;

(iv) making a determination of success or failure in the performance of step iii, said determination optionally being based upon whether or not contact was made with the requesting person that submitted contact data;

(v) preparing a report that includes a determination made in the performance of step iv, which report identifies at least one of a mode of contact used in the performance of step iii, a time of a contact attempt of the performance of step iii, the identity of an agent that performed step iii, and an identifier of the contact plan that sourced the conjoined directions and contact data received in the performance of step ii;

(vi) transmitting the report prepared in the performance of step v to a data collection module; and (vii) repeating steps iii, iv, v and vi a chosen number of times.

11. The method of claim 10, further comprising the steps of:

(viii) receiving and aggregating a number of reports prepared in the repeated performance of step v;

(ix) analyzing the data received in the performance of step viii and as a product of said analyzing, finding correlations between the reported success or failure of contact attempts and other information provided in the course of the performance of step viii, the found correlations optionally relating the success or failure of contact attempts for contact plans with time information, contact data information and contact mode information; and (x) adapting the set of contact plans serviced by the contact plan manager.

12. The method of claim 11, wherein each contact plan adapted in the performance of step x contains information from the group consisting of: a queuing strategy, and IVR script, a contact plan identifier, a contact time, and a mode of contact.

13. The method of claim 11, further comprising the step of: (xi) on condition of determining that a failed contact attempt has been made in step iv and on condition that step x has been later performed, repeating steps ii, iii and iv with previously used contact data from new directions sourced from an adapted contact plan produced from the performance of step x.

14. The method of claim 10, wherein the directions delivered to an agent to contact a requesting person are delivered at a specific time, the contact time not included in the information contained within the delivered directions, and wherein the contact time of the delivered directions is relative to the specific time of delivery.

15. The method of claim 14, wherein the contact time is immediate upon delivery of instructions to contact a requesting person.

16. The method of claim 10, wherein the directions delivered to an agent to contact a requesting person are delivered to a specific agent with an assignment of a particular mode of contact, wherein the mode of contact specified by the delivered directions is implied by delivery of directions to that specific agent being associated with the mode of contact included in the contact plan which sourced the delivered directions, and further wherein said directions include at least but not necessarily more than contact data submitted by a requesting person.

17. The method of claim 10, wherein the receiving of directions to make contact with an inquiring person is made through a mode of communication selected from the group consisting of: email services, instant messaging services, short message services, enhanced messaging services, text messaging services, telephony-based text-to-speech services, and multimedia delivery services.

18. The method of claim 10, wherein directions received in the course of performing step ii specify a mode of contact selected from the group consisting of: a physical address, a telephone number address, an email address, and an instant messaging address; and wherein the contact data included within those received directions contains an address for a requesting person suitable for the mode of contact specified by those received directions.

19. The method of claim 10, wherein the directions received in the performance of step ii include identification of the contact plan that sourced those directions; and wherein with said returning an indication of success or failure of the contact attempt, the received identification of the contact plan is also returned.

20. The method of claim 10, wherein step iii is performed by a component at the location of an opened agent interface, and wherein that component opens a bi-directional audio channel of contact and communication between an agent and a requesting person in accordance with the received prescribed directions for a contact attempt, optionally by way of a dialing module.

* * * * *